(12) United States Patent
Boyce

(10) Patent No.: US 6,450,128 B1
(45) Date of Patent: Sep. 17, 2002

(54) BIRD TRAINING METHOD AND APPARATUS THEREFOR

(76) Inventor: Mark A. Boyce, 664 W. Juanita Ave., Gilbert, AZ (US) 85233

( * ) Notice: Subject to any disclaimer, the term of this patent is extended or adjusted under 35 U.S.C. 154(b) by 0 days.

(21) Appl. No.: 09/858,746

(22) Filed: May 15, 2001

(51) Int. Cl.[7] .......................... A01K 15/02; G08B 23/00
(52) U.S. Cl. ..................... 119/713; 119/718; 340/573.3
(58) Field of Search ................................ 119/713, 718; 307/326; 315/225; 340/500, 573.1, 573.3; 367/197, 198

(56) References Cited

U.S. PATENT DOCUMENTS

| | | | |
|---|---|---|---|
| 2,954,489 A | 9/1960 | Brueggeman et al. | 307/117 |
| 3,270,216 A | 8/1966 | Dersch | 307/117 |
| 3,582,671 A | 6/1971 | Ott | 307/117 |
| 3,823,691 A * | 7/1974 | Morgan | 119/718 |
| 3,847,120 A | 11/1974 | Hicks | 119/29 |
| 3,892,920 A | 7/1975 | Kolm | 179/1 |
| 3,893,081 A | 7/1975 | Hopkins | 340/148 |
| 4,024,413 A | 5/1977 | Olita | 307/117 |
| 4,180,013 A * | 12/1979 | Smith | 119/718 |
| 4,344,071 A * | 8/1982 | Allen | 307/117 |
| 4,408,308 A | 10/1983 | Smith et al. | 367/197 |
| 4,476,554 A | 10/1984 | Smith et al. | 367/197 |
| 4,529,973 A * | 7/1985 | Blamberg | 181/5 |
| 4,630,248 A * | 12/1986 | Scott | 307/117 |
| 5,568,792 A | 10/1996 | Lynch | 119/713 |
| 5,927,233 A * | 7/1999 | Mainini et al. | 119/718 |

FOREIGN PATENT DOCUMENTS

EP          154594 A2 *    9/1985

* cited by examiner

Primary Examiner—Charles T. Jordan
Assistant Examiner—John W. Zerr
(74) Attorney, Agent, or Firm—Meschkow & Gresham, PLC

(57) ABSTRACT

A method (22) and apparatus (20) for training a bird (24) to refrain from uttering a vocalization exceeding a predetermined acoustic level is provided. A control area (26) containing the bird (24) is illuminated with a light (32) coupled to a power source (74) through a normally-closed switch (76). A microphone (40) monitors the control area (26) and captures a sound (28) uttered by the bird (24) to produce an audio signal (86). The audio signal (86) is amplified. A discrimination unit (54) determines if the audio signal (86) exceeds a predetermined threshold (50). A timing unit (60) is triggered when the audio signal (86) exceeds the threshold (50). In response to an output (62) of the timing unit (60), a switching unit (78) opens the normally-closed switch (76) to darken the control area (26) and the bird (24) for a predetermined duration (68). After the predetermined duration (68), the switch (76) is allowed to close and the control area (26) and the bird (24) are re-illuminated.

18 Claims, 2 Drawing Sheets

BIRD TRAINING METHOD AND APPARATUS THEREFOR

TECHNICAL FIELD OF THE INVENTION

The present invention relates to the field of bird training methods and apparatus. More specifically, the present invention relates to the field of methods and apparatus for training birds to refrain from uttering pre-selected vocalizations.

BACKGROUND OF THE INVENTION

Some species of birds, most notably but not limited to those of the order Psittaciformes, e.g., the parrot, cockatoo, lory, macaw, parakeet, etc., have the ability to mimic speech and are often kept as pets. These birds are, in addition to their inherent beauty, intelligent and entertaining. Some species of these birds have life spans approximating the adult lifetimes of their owners, and therefore become long-term companions.

A problem exists in that occasionally such a bird may develop the habit of uttering undesirable vocalizations. Screeching, squawking, whistling, and other loud vocalizations may be distracting and unpleasant to those nearby. In some cases, such loud sounds may violate local ordinances, thereby constituting a nuisance.

A similar problem exists in that such a bird, being capable of mimicking speech, may be exposed to and may learn to mimic undesirable speech, such as cursing, racial or ethnic slurs, and sexist or other disparaging terms.

It is highly desirable, therefore, that some method and/or apparatus be provided that may be used to train a bird away from the use of such undesirable vocalizations. Such a training method and/or apparatus would desirably be non-injurious to the bird. Such a training method and/or apparatus would also desirably be automated, so as not to monopolize a trainer's time and effort. Such a training method and/or apparatus would also desirably be inexpensive.

SUMMARY OF THE INVENTION

Accordingly, it is an advantage of the present invention that a bird training method and apparatus therefor is provided.

It is another advantage of the present invention that a training method and apparatus is provided that is non-injurious in training a bird away from the use of undesirable vocalizations.

It is another advantage of the present invention that a training method and apparatus is provided that is automated.

It is another advantage of the present invention that a training method and apparatus is provided that is inexpensive to produce and implement.

The above and other advantages of the present invention are carried out in one form by a method for training a bird to refrain from uttering a pre-selected vocalization. This method incorporates locating a bird in a control area, capturing a sound uttered by the bird to produce an audio signal, determining if the sound is the pre-selected vocalization, triggering a timing unit to shift its output from an idle state to an active state for a predetermined duration when the sound is determined to be the pre-selected vocalization, and darkening the control area for the predetermined duration.

The above and other advantages of the present invention are carried out in another form by an apparatus for training a bird to refrain from uttering a pre-selected vocalization. The apparatus incorporates a microphone located proximate a control area and configured to capture as an audio signal a sound uttered by a bird located in the control area, a discrimination unit coupled to the microphone and configured to determine if the sound is the pre-selected vocalization, a timing unit coupled to the discrimination unit and having an output configured to transit from an idle state to an active state when the discrimination unit determines that the sound is the pre-selected vocalization and configured to remain at the active state for a predetermined duration, a switching unit coupled to the timing unit and incorporating a switch configured to be closed when the output of the timing unit is in the idle state and open when the output of the timing unit is in the active state, and a light coupled to a power source through the switch and configured to illuminate the control area when the switch is closed.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE PREFERRED EMBODIMENTS

Figure 1:
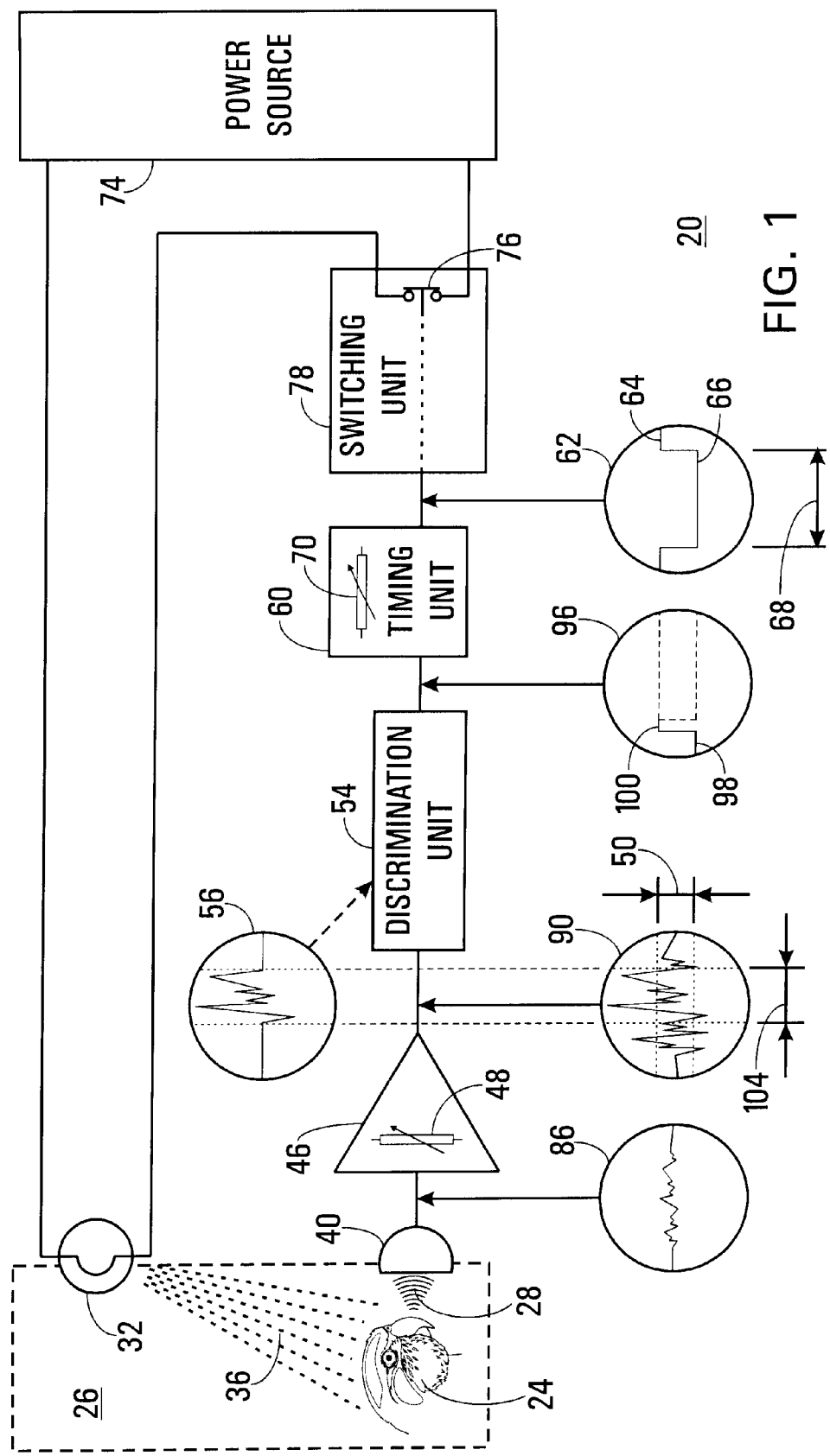
FIG. 1 shows a block diagram of a bird training apparatus in accordance with a preferred embodiment of the present invention.
Figure 2:
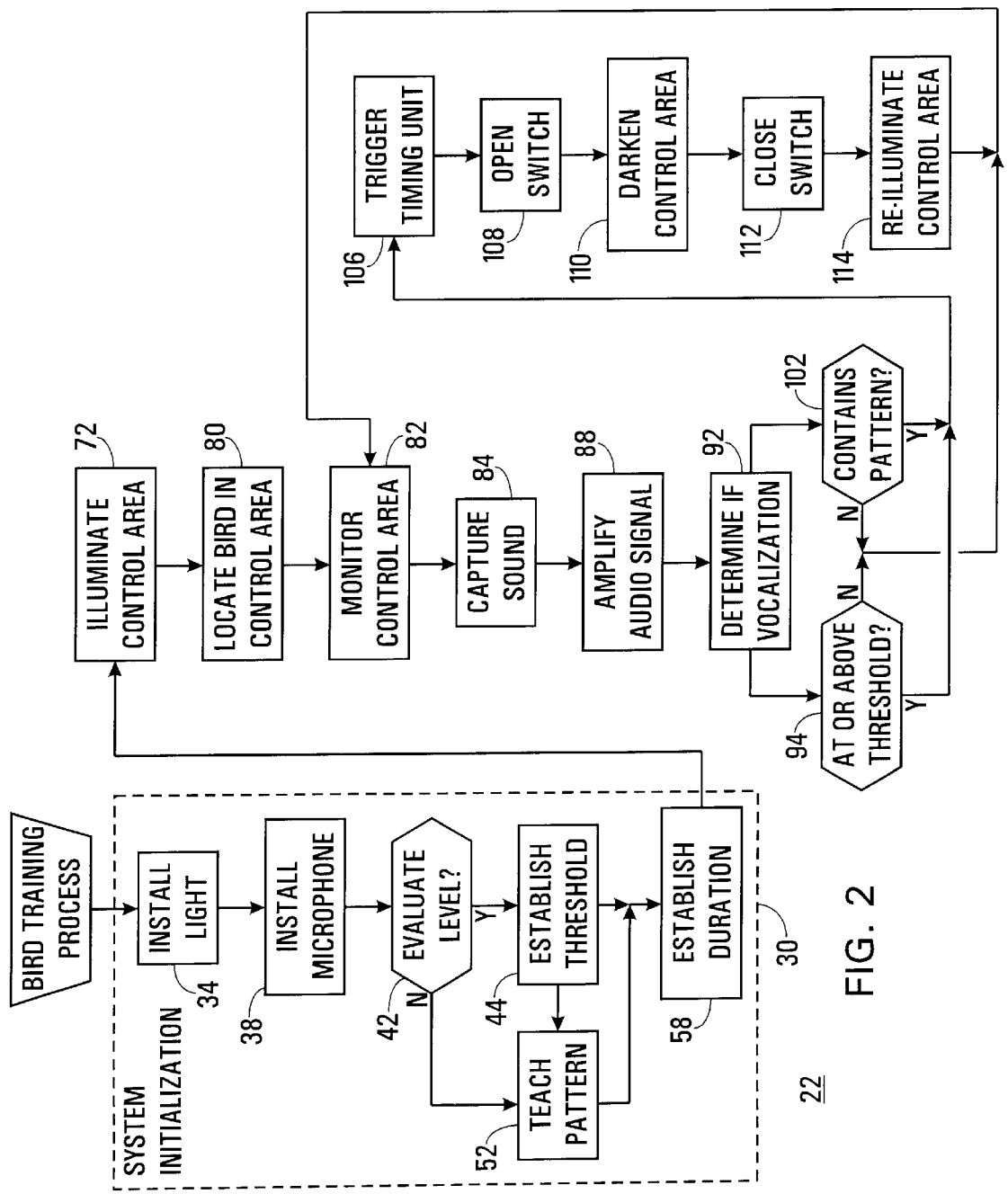
FIG. 2 shows a flowchart of a bird training process for use with the apparatus of FIG. 1 in accordance with a preferred embodiment of the present invention.

FIG. 1 shows a block diagram of a bird training apparatus 20, and FIG. 2 shows a flowchart of a bird training process 22 for use with apparatus 20 in accordance with a preferred embodiment of the present invention.

In bird training process 22, a bird 24 is allowed to reside in an illuminated control area 26. Sounds uttered by bird 24 are monitored, and when a sound 28 matches a pre-selected and undesired vocalization, then control area 26 is darkened. The darkening of control area 26 causes bird 24 to relax and become lethargic. After a predetermined duration of time, control area 26 is re-illuminated, and bird 24 becomes active. Process 22 therefore provides feedback to bird 24, and trains bird 24 to refrain from uttering the pre-selected vocalization.

The pre-selected vocalization may be established as a predetermined acoustic level or a predetermined acoustic pattern. If the pre-selected vocalization is established as a predetermined acoustic level, then any sound 28 having a loudness (acoustic level) greater than the predetermined acoustic level will trigger darkness. This methodology is ideally suited to train bird 24 to refrain from uttering screeches, squawks, whistles, and other loud sounds.

If the pre-selected vocalization is established as a predetermined acoustic pattern, then any sound 28 or combination of sounds 28 containing an acoustic pattern substantially identical to the predetermined acoustic pattern (e.g., a phrase containing an offending word) will trigger darkness. This methodology is ideally suited to train bird 24 to refrain from uttering curses, racial or ethnic slurs, and sexist or other disparaging remarks.

In bird training process 22, an initialization subprocess 30 establishes operating parameters. A light 32 is installed in a task 34 so that light 32 will shed illumination 36 upon (i.e., illuminate) control area 26. Control area 26 may be any area where illumination may be conveniently controlled, e.g. a room, closet, etc.

In a task 38, a microphone 40 is installed proximate control area 26. Microphone 40 is therefore in a position to monitor control area 26 for sounds uttered by bird 24 (discussed hereinafter).

In a design task 42, a decision is made to evaluate sound 28 based upon acoustic level or acoustic pattern. If in task 42, a decision is made to evaluate sound 28 by comparing sound 28 to a predetermined acoustic level, then in a task 44 the predetermined acoustical level is established in apparatus 20. In the preferred embodiment, an amplifier 46 is coupled to microphone 40. In task 44, a control element 48 of amplifier 46 is adjusted to establish an amplitude threshold 50 analogous to the desired predetermined acoustic level.

If in task 42, a decision is made to evaluate sound 28 by comparing sound 28 to a predetermined acoustic pattern, then in a task 52 the predetermined acoustical pattern is established in apparatus 20. In the preferred embodiment, a discrimination unit 54 is coupled to amplifier 46. In task 52, a reference signal 56 analogous to the predetermined acoustic pattern is taught to discrimination unit 54.

In a task 58, initialization subprocess 30 establishes the duration of the time interval during which control area 26 is darkened. In the preferred embodiment, a timing unit 60 is coupled to discrimination unit 54. Timing unit 60 has a bi-state output 62. Output 62 normally resides in an idle state 64. When timing unit 60 is triggered, output 62 transits from idle state 64 to an active state 66. Output 62 remains in active state 66 for a predetermined duration 68 of time, after which output 62 returns to idle state 64. A control element 70 in timing unit 60 is used to establish predetermined duration 68 in task 58.

Tasks 34, 38, 42, 44, 52, and 58 make up initialization subprocess 30. Those skilled in the art will appreciate that the manner in which these tasks are performed is not a part of the present invention. It will also be appreciated that initialization subprocess 30 may include other tasks not depicted herein. Additionally, it will be appreciated that the order in which the tasks in initialization subprocess 30 are performed is not a part of nor relevant to the present invention. Variations in the performance of any of tasks 34, 38, 42, 44, 52, and 58, an inclusion of additional tasks, and variations in the order of tasks within initialization subprocess 30 do not depart from the spirit of the present invention.

In a task 72, bird training process 22 illuminates control area 26. Task 72 is effected by applying power to light 32. Light 32 is coupled to a power source 74 through a normally-closed switch 76 located within a switching unit 78. Activating power source 74, which need be no more than the normal A-C line power, effects task 72.

In a task 80, bird 24 is located within control area 26. Bird 24 is therefore in an illuminated area, and bird 24 may become active.

In a task 82, microphone 40 monitors control area 26 for sounds 28 uttered by bird 24. When bird 24 utters a sound 28, microphone 40 captures that sound 28 in a task 84 and produces an audio signal 86. Amplifier 46 then amplifies audio signal 86 in a task 88 to produce an amplified audio signal 90.

Amplified audio signal 90 is passed to discrimination unit 54. In a task 92, discrimination unit 54 determines if sound 28 uttered by bird 24 meets the criteria for the pre-selected vocalization (not shown).

If a decision was made in design task 42 of initialization subprocess 30 to evaluate sound 28 by comparing sound 28 to a predetermined acoustic level (i.e., by determining if sound 28 exceeds a predetermined loudness), then, in a decision subtask 94, discrimination unit 54 determines if an amplitude of amplified audio signal 90 exceeds amplitude threshold 50 established in task 44. An output 96 of discrimination unit 54 remains in an idle state 98 as long as the amplitude of amplified audio signal 90 does not exceed predetermined amplitude threshold 50. If the amplitude of amplified audio signal 90 exceeds predetermined amplitude threshold 50, then discrimination-unit output 96 transits from idle state 98 to a matched state 100. This indicates that the loudness of sound 28 uttered by bird 24 exceeds the predetermined acoustical level of the pre-selected vocalization. That is, bird 24 has uttered a loud screech, squawk, whistle, etc.

Those skilled in the art will appreciate that, when sound 28 is evaluated by comparing sound 28 to a predetermined acoustic level, then discrimination unit 54 may be a simple level detector (e.g., a comparator or Schmitt trigger circuit) where amplitude threshold 50 is a triggering point. The construction of discrimination unit 54 is not a part of the present invention. The use of a particular construction for discrimination unit 54 does not depart from the spirit of the present invention.

It will also be appreciated that control element 48 used to establish amplitude threshold 50 in task 44 may be located within discrimination unit 54 rather than amplifier 46 without departing from the spirit of the present invention.

If a decision was made in design task 42 of initialization subprocess 30 to evaluate sound 28 by comparing sound 28 to a predetermined acoustic pattern (i.e., by determining if sound 28 contains a predetermined syllable, word, or phrase), then, in a decision subtask 102, discrimination unit 54 determines if amplified audio signal 90 contains an audio pattern 104 substantially identical to reference signal 56. Discrimination-unit output 96 remains in idle state 98 as long as amplified audio signal 90 does not contain audio pattern 104. If amplified audio signal 90 contains audio pattern 104, then discrimination-unit output 96 transits from idle state 98 to matched state 100. This indicates that sound 28 uttered by bird 24 contains a syllable, word, or phrase that is the pre-selected vocalization. That is, bird 24 has uttered undesirable speech, such as cursing, racial or ethnic slurs, and sexist or other disparaging terms.

Those skilled in the art will appreciate that, when sound 28 is evaluated by comparing sound 28 to a predetermined acoustic pattern, then discrimination unit 54 may be a computer (i.e., processor, memory, etc.) running a speech-recognition program. When the program recognizes the pattern of a syllable, word, or phrase taught to (i.e., programmed into) discrimination unit 54 in task 52, then discrimination-unit output 96 transits from idle state 98 to matched state 100. The construction of discrimination unit 54 is not a part of the present invention. The use of a particular construction for discrimination unit 54 does not depart from the spirit of the present invention.

Discrimination-unit output 96 passes to timing unit 60. In a task 106, timing unit 60 is triggered when discrimination-unit output 96 transits from idle state 98 to matched state 100. The triggering of timing unit 60 causes timing-unit output 62 to transit from idle state 64 to active state 66, to remain in active state 66 for duration 68, and to transit from active state 66 back to idle state 64 when duration 68 is ended. The length of duration 68 was established in task 58 by adjusting control element 70.

Timing-unit output 62 passes to switching unit 78. Switching unit 78 controls the operation of normally-closed switch 76. A task 108 opens normally-closed switch 76 when timing-unit output 62 is in active state 66 throughout duration 68. This removes power from light 32, and causes task 110 to darken control area 26 and bird 24 for duration 68. By removing illumination 36 from bird 24, task 110 allows bird 24 to become quiescent. Bird 24 should then cease uttering sounds 28 that may be the pre-selected vocalizations (not shown). Predetermined duration 68 may be any desired period of darkness. Depending upon bird 24, duration 68 may need to be extended to several minutes or more.

At the end of duration 68, a task 112 allows switch 76 to close when timing-unit output 62 returns to idle state 64. This returns power to light 26, and causes task 114 to re-illuminate control area 26 and bird 24. By re-applying illumination 36 to bird 24, task 114 allows bird 24 to become active. Bird 24 should respond to repeated periods of darkness by ceasing to utter sounds 28 that are the pre-selected vocalizations.

Those skilled in the art will appreciate that switching unit 78 may be any convenient relay, either mechanical or solid-state, that will allow timing-unit output 62 to control power to light 32. The use of any particular configuration for switching unit 78 does not depart from the spirit of the present invention.

In an alternative embodiment (not shown), control area 26 may be a cage for bird 24 and light 32 may be replaced with a mechanism to cover the cage in order to remove illumination 36 from bird 24. Those skilled in the art will appreciate that the substitution of the cage-covering mechanism for light 32 does not depart from the spirit of the present invention.

Furthermore, in an alternative embodiment (not shown), microphone 40 and switching unit 78 may be input and output peripherals, respectively, to a conventional personal computer. In this embodiment, audio signal 86 is the input to the computer from microphone 40; amplifier, discrimination unit, and timing unit are all implemented within the computer; and timing-unit output 62 is the output from the computer to switching unit 78. Amplitude threshold 50 and/or signal pattern 104, and duration 68 may all be determined in software. The use of a computer to implement any portion(s) of bird training apparatus 20 in lieu of one or more discrete devices does not depart from the spirit of the present invention.

In summary, the present invention teaches bird training method 22 and apparatus 20 therefor. Training method 22 and apparatus 20 are non-injurious to bird 24 in training bird 24 away from the use of undesirable vocalizations. Training method 22 and apparatus 20 are automated, not requiring constant attention by an owner of bird 24. Training method 22 and apparatus 20 are inherently inexpensive to produce and implement.

Although the preferred embodiments of the invention have been illustrated and described in detail, it will be readily apparent to those skilled in the art that various modifications may be made therein without departing from the spirit of the invention or from the scope of the appended claims.

What is claimed is:

1. A method for training a bird to refrain from uttering a pre-selected vocalization, said method comprising:
    locating said bird in a control area;
    capturing a sound uttered by said bird to produce an audio signal;
    determining if said sound is said pre-selected vocalization;
    triggering, when said determining activity determines said sound is said pre-selected vocalization, a timing unit to shift an output from an idle state to an active state for a predetermined duration; and
    darkening said control area for said predetermined duration.

2. A method as claimed in claim 1 additionally comprising amplifying said audio signal prior to said determining activity.

3. A method as claimed in claim 1 wherein:
    said pre-selected vocalization is a vocalization exceeding a predetermined acoustic level; and
    said determining activity determines if an acoustic level of said sound exceeds said predetermined acoustic level.

4. A method as claimed in claim 3 wherein:
    said method additionally comprises establishing a threshold amplitude for said audio signal;
    said method additionally comprises amplifying said audio signal wherein a level of amplification of said audio signal by said amplifying activity causes said audio signal to exceed said threshold amplitude when said sound exceeds said predetermined acoustic level; and
    said determining activity determines if said amplified audio signal is greater than said threshold amplitude.

5. A method as claimed in claim 1 wherein said pre-selected vocalization comprises a predetermined acoustic pattern.

6. A method as claimed in claim 5 wherein:
    said method additionally comprises teaching a discrimination unit a reference signal analogous to said predetermined acoustic pattern; and
    said determining activity comprises comparing said audio signal to said reference signal to determine if said sound contains substantially said predetermined acoustic pattern.

7. A method as claimed in claim 1 additionally comprising establishing said predetermined duration of said active state of said output of said timing unit.

8. A method as claimed in claim 1 wherein:
    said method additionally comprises illuminating said control area with a light coupled to a power source through a normally-closed switch when said output of said timing unit is in said idle state; and
    said darkening activity comprises opening said switch for said predetermined duration when said output of said timing unit is in said active state.

9. A method as claimed in claim 8 additionally comprising re-illuminating said control area when said output of said timing unit has returned to said idle state after said predetermined duration.

10. A method as claimed in claim 1 additionally comprising installing a microphone proximate said control area to effect said capturing activity.

11. An apparatus for training a bird to refrain from uttering a pre-selected vocalization, said apparatus comprising:
    a microphone located proximate a control area and configured to capture as an audio signal a sound uttered by said bird when said bird is located in said control area;
    a discrimination unit coupled to said microphone and configured to determine if said sound is said pre-selected vocalization;

a timing unit coupled to said discrimination unit and having an output configured to transit from an idle state to an active state when said discrimination unit determines that said sound is said pre-selected vocalization and configured to remain at said active state for a predetermined duration;

a switching unit coupled to said timing unit and incorporating a switch configured to be closed when said output of said timing unit is at said idle state and open when said output of said timing unit is at said active state; and a light coupled to a power source through said switch and configured to illuminate said control area when said switch is closed.

12. An apparatus as claimed in claim 11 additionally comprising an amplifier coupled to said microphone and configured to amplify said audio signal.

13. An apparatus as claimed in claim 11 wherein said pre-selected vocalization is a vocalization exceeding predetermined acoustic level, and wherein:

said discrimination unit is configured to determine if an acoustic level of said sound exceeds said predetermined acoustic level.

14. An apparatus as claimed in claim 13 wherein:

said apparatus additionally comprises an amplifier having a control element configured to establish a threshold amplitude for said audio signal at which said sound is equal to said predetermined acoustic level; and said discrimination unit is configured to determine if said audio signal exceeds said threshold amplitude.

15. An apparatus as claimed in claim 11 wherein said pre-selected vocalization is a predetermined acoustic pattern, and wherein said discrimination unit contains a reference signal analogous to said predetermined acoustic pattern, and compares said audio signal to said reference signal to determine if said sound contains substantially said predetermined acoustic pattern.

16. An apparatus as claimed in claim 11 wherein said timing unit comprises a control element configured to establish said predetermined duration of said active state.

17. A method for training a bird to refrain from uttering a vocalization exceeding a predetermined acoustic level, said method comprising:

illuminating a control area with a light coupled to a power source through a normally-closed switch;

locating said bird in said control area;

capturing a sound uttered by said bird to produce an audio signal;

establishing an amplitude threshold for said audio signal;

amplifying said audio signal so that said audio signal exceeds said threshold amplitude when said sound exceeds said predetermined acoustic level;

determining if said audio signal exceeds said threshold amplitude;

triggering, when said determining activity determines said audio signal exceeds said threshold amplitude, a timing unit to transit an output from an idle state to an active state for a predetermined duration, and to transit said output back to said idle state after said predetermined duration; and darkening said control area for said predetermined duration by causing said switch to open in response to said active state of said output of said timing unit.

18. A method as claimed in claim 17 additionally comprising re-illuminating said control area after said darkening activity has transpired for said predetermined duration by causing said switch to close in response to said idle state of said output of said timing unit.

* * * * *